(12) United States Patent
Weck et al.

(10) Patent No.: US 6,375,202 B2
(45) Date of Patent: Apr. 23, 2002

(54) HOUSEHOLD CART AND METHOD OF USING SAME

(75) Inventors: David Weck, 1550 Bay Dr., Miami Beach, FL (US) 33141; Erwin M. Frey, Fort Lauderdale, FL (US)

(73) Assignee: David Weck, Miami Beach, FL (US)

( * ) Notice: Subject to any disclaimer, the term of this patent is extended or adjusted under 35 U.S.C. 154(b) by 0 days.

(21) Appl. No.: 09/840,899

(22) Filed: Apr. 25, 2001

Related U.S. Application Data

(63) Continuation of application No. 09/027,926, filed on Feb. 23, 1998, now Pat. No. 6,224,072.

(51) Int. Cl.[7] .................................................. B62B 3/02
(52) U.S. Cl. ............... 280/47.35; 211/204; 280/47.371; 280/79.3
(58) Field of Search ................................. 403/321, 330; 211/204, 206, 208; 280/79.11, 79.3, 47.35, 47.315, 47.34, 47.371, 47.36

(56) References Cited

U.S. PATENT DOCUMENTS

| 15,071 | A | 6/1856 | Gould |
|---|---|---|---|
| 462,112 | A | 10/1891 | Coup |
| 894,561 | A | 7/1908 | Wood |
| 1,221,997 | A | 10/1917 | Koehler |
| 2,154,839 | A | 4/1939 | Franklin |
| 2,533,324 | A | 12/1950 | Mendle |
| 2,712,452 | A | 7/1955 | Hallowell et al. |
| 2,798,618 | A | 7/1957 | Singer |
| 3,246,768 | A | 4/1966 | Carlos |
| 3,582,102 | A | 6/1971 | Bewick |
| 3,689,098 | A | 9/1972 | Rubin |
| 4,032,165 | A | 6/1977 | Russell |
| 4,165,088 | A | 8/1979 | Nelson |
| 4,802,681 | A | 2/1989 | Hung |
| 5,090,725 | A | 2/1992 | Feldner |
| 5,186,341 | A | 2/1993 | Zeid |
| 5,190,305 | A | 3/1993 | Putman |
| 5,257,892 | A | 11/1993 | Branch |

*Primary Examiner*—Michael Mar
(74) *Attorney, Agent, or Firm*—Lowe Hauptman Gilman & Berner, LLP

(57) ABSTRACT

A household cart has a wooden or molded plastic rectangular base for carrying household items. Four caster assemblies on the base are close to the four corners of the base. A U-shaped handle has hooks for carrying household items approximately halfway between side edges of the base, about equidistant from front and back edges of the base. The handle can be positioned either transversely or longitudinally of the base. In the handle transverse position, legs of the handle fit into a first pair of receptacles located between (1) the casters close to the base back edge and (2) the cart transverse center line. In the longitudinal position, the legs fit into a second pair of receptacles located along a longitudinal center line of the base. The receptacles of the first pair are spaced from each other by the same distance as the receptacles of the second pair. The handle has hooks for carrying the household items and is selectively extendable so it can carry relatively long household items, such as pants, skirts and topcoats. The handle has spring properties and is dimensioned so it can fit around and be stowed on skirts on the caster assemblies, enabling the cart to be put in small spaces, such as an automobile trunk.

6 Claims, 11 Drawing Sheets

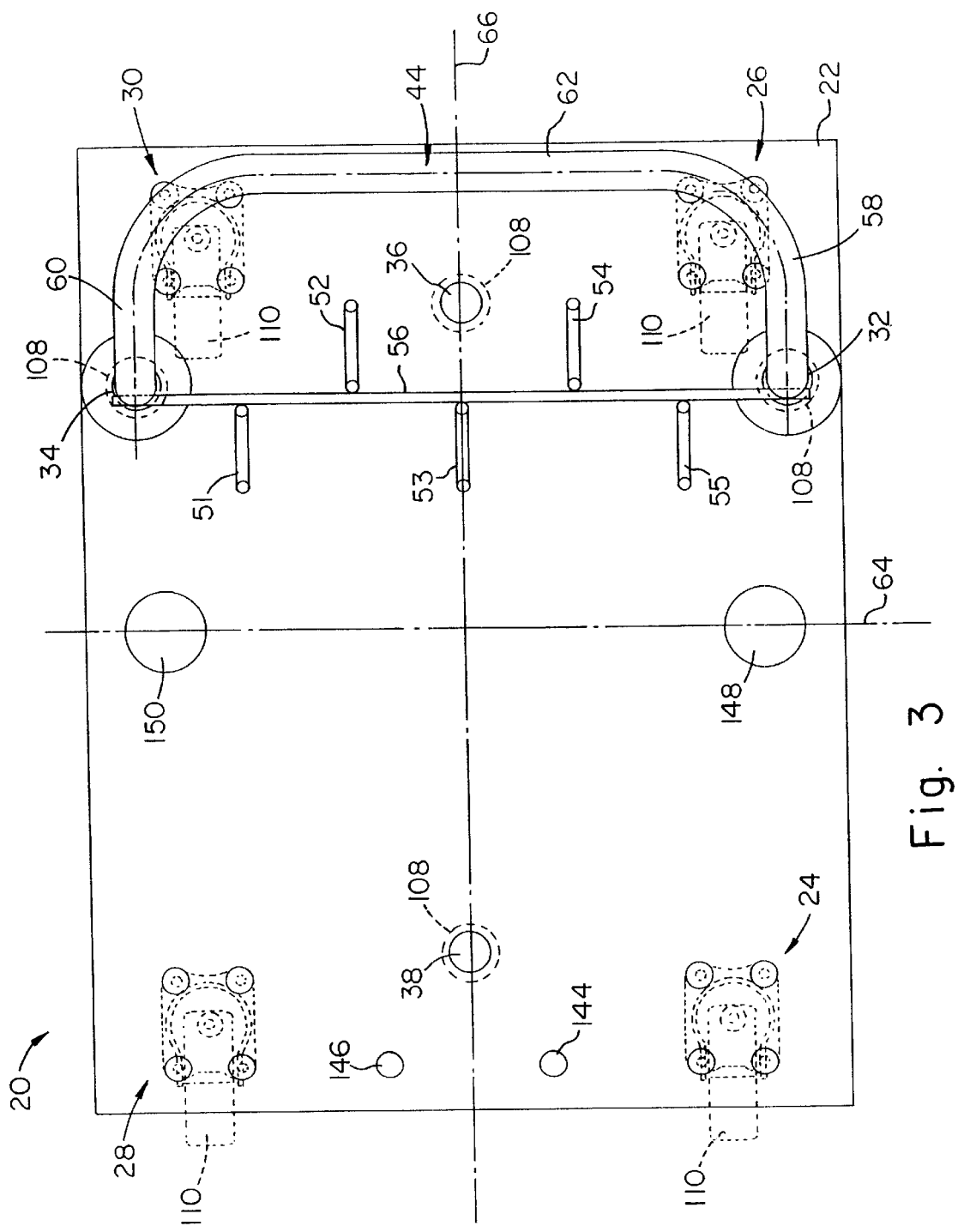

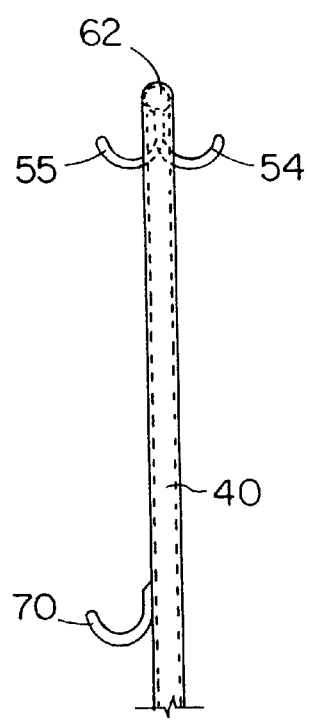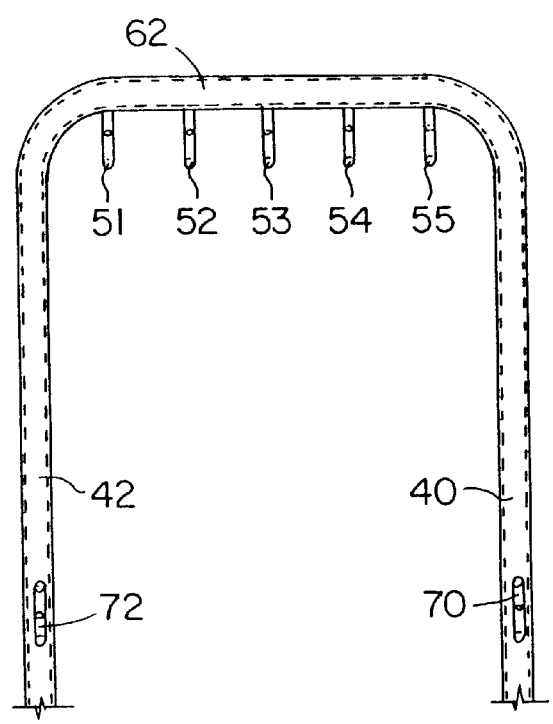
Fig. 12
Fig. 11

HOUSEHOLD CART AND METHOD OF USING SAME

This application is a Continuation of application Ser. No. 09/027,926 filed Feb. 23, 1998 now U.S. Pat. No. 6,224,072.

FIELD OF INVENTION

The present invention relates generally to household carts and more particularly to a household cart including a base enabling a handle for the cart to be selectively positioned at plural positions relative to the base.

BACKGROUND ART

There are numerous commercialized household carts for carrying household items, such as groceries, beverages and some items of wearing apparel. These prior art household carts have frequently included a pair of wheels mounted on a basket. A handle, frequently having an inverted U shape, usually extends from the basket and, in certain configurations, telescopes with respect to the basket. Some of the baskets are foldable, for ease of storage in automotive vehicles and residences. The typical prior household carts have limited volumetric and weight capacity. In addition, they are not usually adapted to carry elongated clothing articles, such as pants, suits or skirts, without folding and/or compressing the articles against each other. Since several of these articles of clothing are frequently on hangers while transported to a residence from a cleaning establishment, the present household carts are rarely used by householders for such articles. Certainly, a householder does not want his or her clothing folded and compressed after being commercially pressed. The prior art household carts have generally been incapable of carrying substantial loads, such as kitchen, laundry room or basement "white" appliances. Also, the prior art household carts have generally been difficult to manage on steps or street curbs.

Because of these problems, the prior art household carts have met with only limited success. Consequently, the vast majority of householders transport household items between their automotive vehicles and residence by hand. This frequently necessitates several back and forth trips. When a householder transports clothing articles, such as topcoats, full length dresses, suits, pants and skirts, from an automotive vehicle to a residence, the householder usually grasps a large number of hangers and slings the clothing over his or her shoulder, causing significant hand pain. In addition, the clothing articles are compressed together and the expense of commercial pressing is, to a certain extent, wasted. There is, to our knowledge, no currently available household cart capable of carrying garments on hangers, simultaneously with carrying other items, such as groceries, particularly heavy items such as cases of beverages. Further, many household carts of which we are aware are relatively expensive and difficult to maneuver.

It is, accordingly, an object of the present invention to provide a new and improved, relatively inexpensive and highly flexible household cart having the capability of carrying many different types of household items.

Another object of the invention is to provide a new and improved relatively inexpensive household cart having a handle which can be positioned in several different positions on the cart.

A further object of the invention is to provide a new and improved household cart that can be easily stowed in a trunk (i.e., a boot in the United Kingdom) of an automobile.

An additional object of the invention is to provide a new and improved household cart including a handle having plural operative positions and which can be stowed on the cart so the cart can be easily stored in a relatively small volume, such as an automobile trunk or behind a door or in a closet of a residence.

An added object of the invention is to provide a new and improved household cart including a handle selectively having relatively short and long lengths, selectively enabling the cart to (1) be easily stowed and (2) carry relatively large clothing apparel items, such as topcoats, full length dresses, suits, pants and skirts.

A further object of the invention is to provide a new and improved household cart which can easily be wheeled about a kitchen and is arranged so items to be stored in kitchen receptacles, such as cabinets and refrigerators, can easily be removed from the cart, without bending.

An additional object of the invention is to provide a new and improved household cart having a handle for carrying household items, wherein the handle is positioned relative to wheels of the cart to minimize the likelihood of cart tipping.

A further object of the invention is to provide a new and improved household cart having a base for securely carrying relatively heavy articles, such as beverage cases and watermelons, as well as heavier household articles such as refrigerators, and having a handle for carrying other household items.

SUMMARY OF THE INVENTION

In accordance with one aspect of the invention, a household cart comprises a household item carrying base including first and second receptacles adjacent the base back edge for selectively receiving first and second opposed legs of a handle for carrying household items. The first and second receptacles are positioned to cause the handle to extend substantially transversely of the base, between side edges of the base in proximity to two wheels adjacent the base back edge. The base also includes third and fourth receptacles positioned (1) between the side edges for selectively receiving the first and second opposed legs of the handle and (2) to cause the handle to extend substantially longitudinally of the base between the base front and back edges. To stabilize the base while the handle is in the third and fourth receptacles, the base includes at least one and preferably two wheels adjacent the base front edge.

Preferably, for stabilization, the third and fourth receptacles are approximately midway between the side edges and the cart includes four wheels, having locations defining a rectangle. For added stability the two back wheels are closer to the back edge than the first and second receptacles. The handle is positioned between a transverse center line of the cart and the back edge when the handle is in situ in the first and second receptacles. A structure on the handle for receiving the household items is arranged so that when the handle is in situ in the first and second receptacles the structure and its contents apply a torque on the handle tending to turn the handle away from the back edge and toward the transverse center line.

As an added feature, studs downwardly depending from the base receive hooks of at least one elasticized tie down cord. The base includes openings for receiving the tie down cords for holding household items in place on the base.

In accordance with another aspect of the invention a household cart comprising a household item carrying base carries two wheels adjacent its back edge and two wheels adjacent its front edge and a handle for carrying household items. The base includes a pair of receptacles for selectively receiving first and second opposed legs of the handle. The four wheels have locations defining a rectangle on the base. Each wheel is mounted on a housing having a structure protruding downwardly from the base adjacent each of the sides of the base. The handle has spring properties and a geometry such that inner portions of the first and second legs thereof frictionally engage and are frictionally held in place by the spring properties of the handle and the protruding structure of the housing for each of the four wheels.

Another aspect of the invention concerns a household cart for carrying various household items comprising a household item carrying base including at least two wheels and a handle for carrying household items. The handle includes selectively extendable legs for enabling the effective length of the handle to be changed at will. The handle when (a) in an expanded position has a length sufficient to carry a topcoat on a hangar suspended from an upper part of the handle and (b) in a retracted position has a length short enough to enable the cart to be placed in a trunk of an automobile. When the cart is placed in the automobile trunk, the legs of the handle extend in a plane generally parallel to the face of the base.

The above and still further objects, features and advantages of the present invention will become apparent upon consideration of the following detailed descriptions of several specific embodiments thereof, especially when taken in conjunction with the accompanying drawings.

BRIEF DESCRIPTION OF THE DRAWING

FIG. 3 is a top view of the cart configuration illustrated in FIGS. 1 and 2;

FIG. 11 is a front view of a modified handle in accordance with the invention;

FIG. 12 is a side view of the handle illustrated in FIG. 11;

DESCRIPTION OF THE PREFERRED EMBODIMENT

Figures 1, 2:
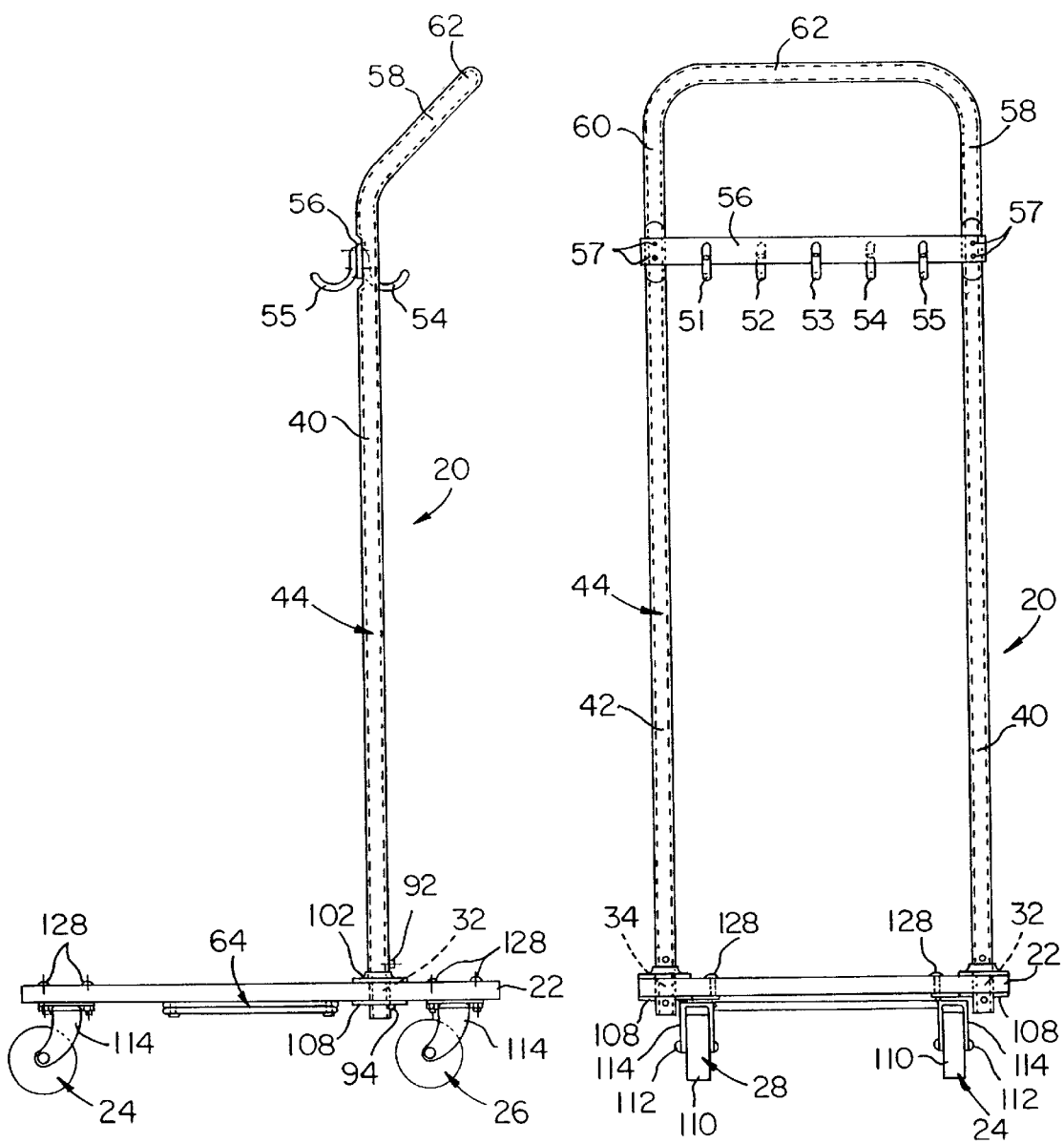
FIG. 1 is a side view of a cart in accordance with a first embodiment of the invention, wherein a handle of the cart is in its primary position, extending transversely of a wooden base in front of rear caster wheels.
FIG. 2 is a front view of the structure illustrated in FIG. 1.
Figure 5:
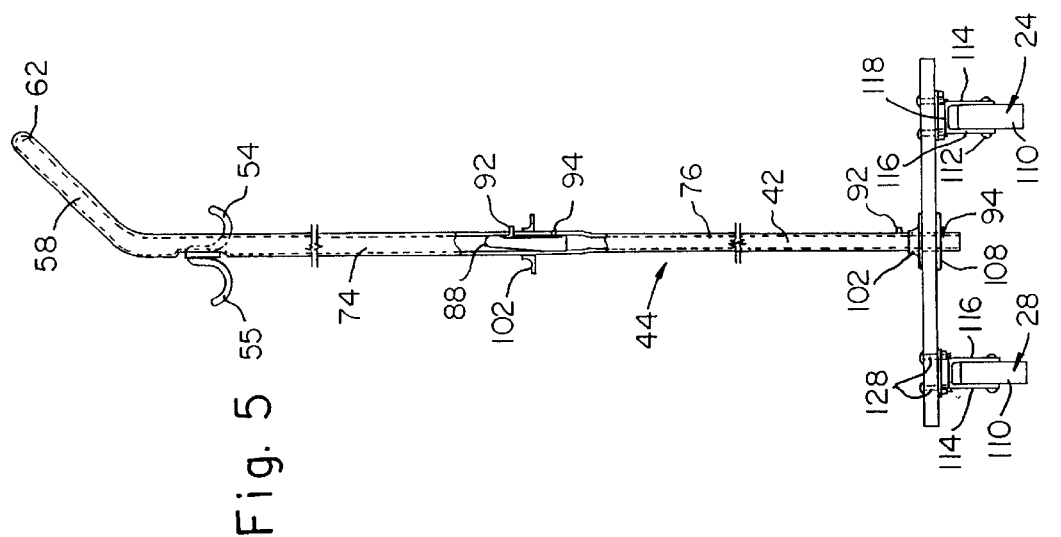
FIG. 5 is a front view of the structure illustrated in FIG. 4.
Figure 4:
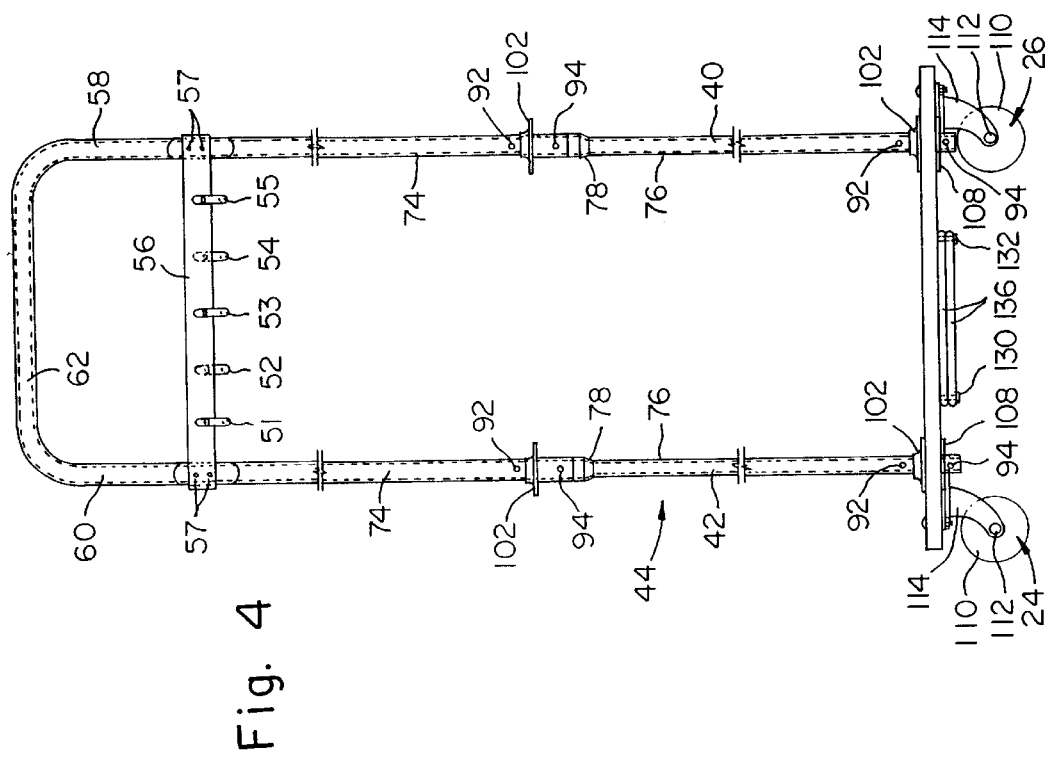
FIG. 4 is a side view of the cart illustrated in FIG. 1, wherein the handle is in its secondary position, extending longitudinally of the base.
Figure 6:
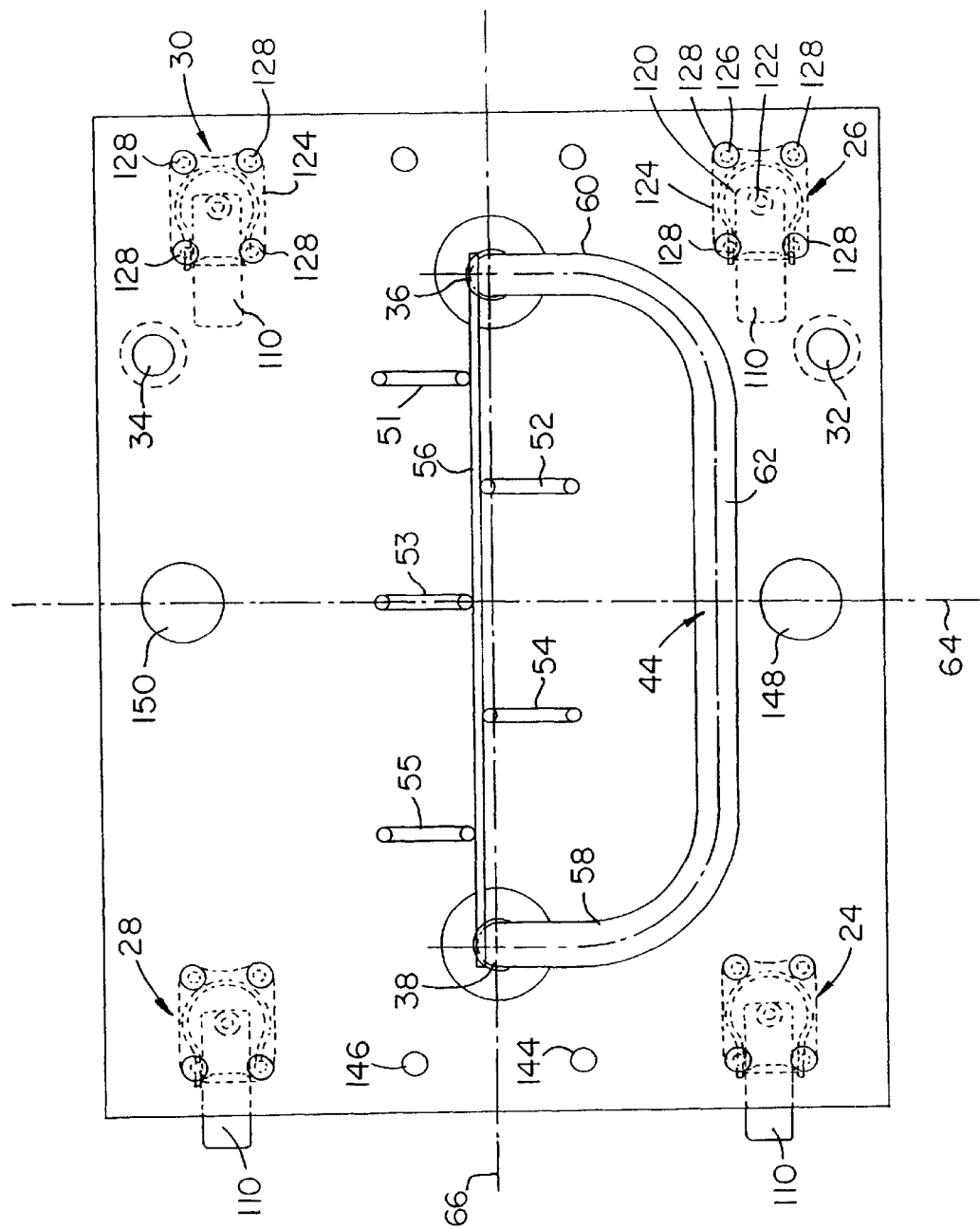
FIG. 6 is a top view of the cart configuration illustrated in FIGS. 4 and 5.
Figure 7:
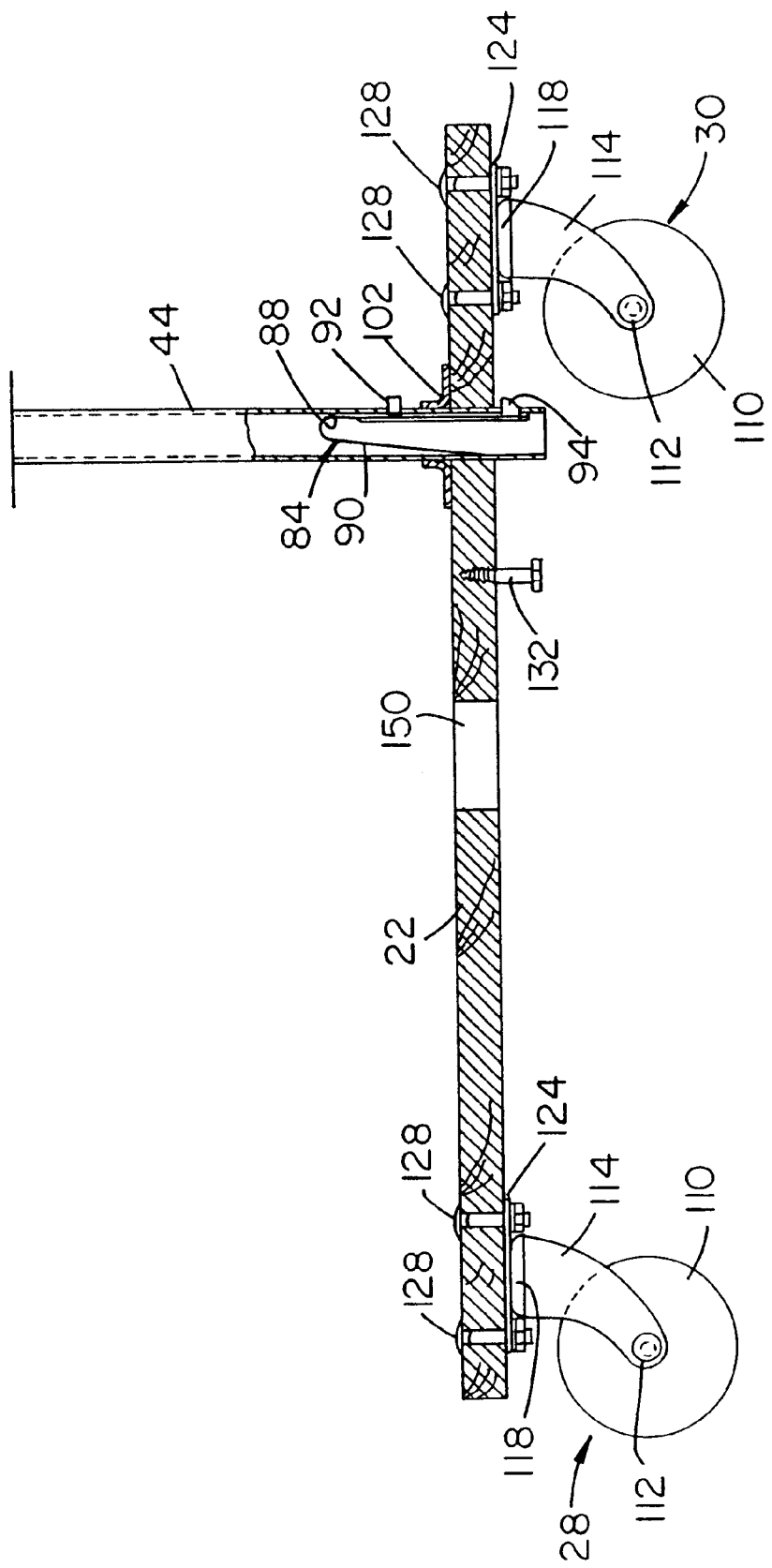
FIG. 7 is a side sectional view of the base illustrated in FIGS. 1–6, with the handle in the position illustrated in FIGS. 1–3.
Figure 8:
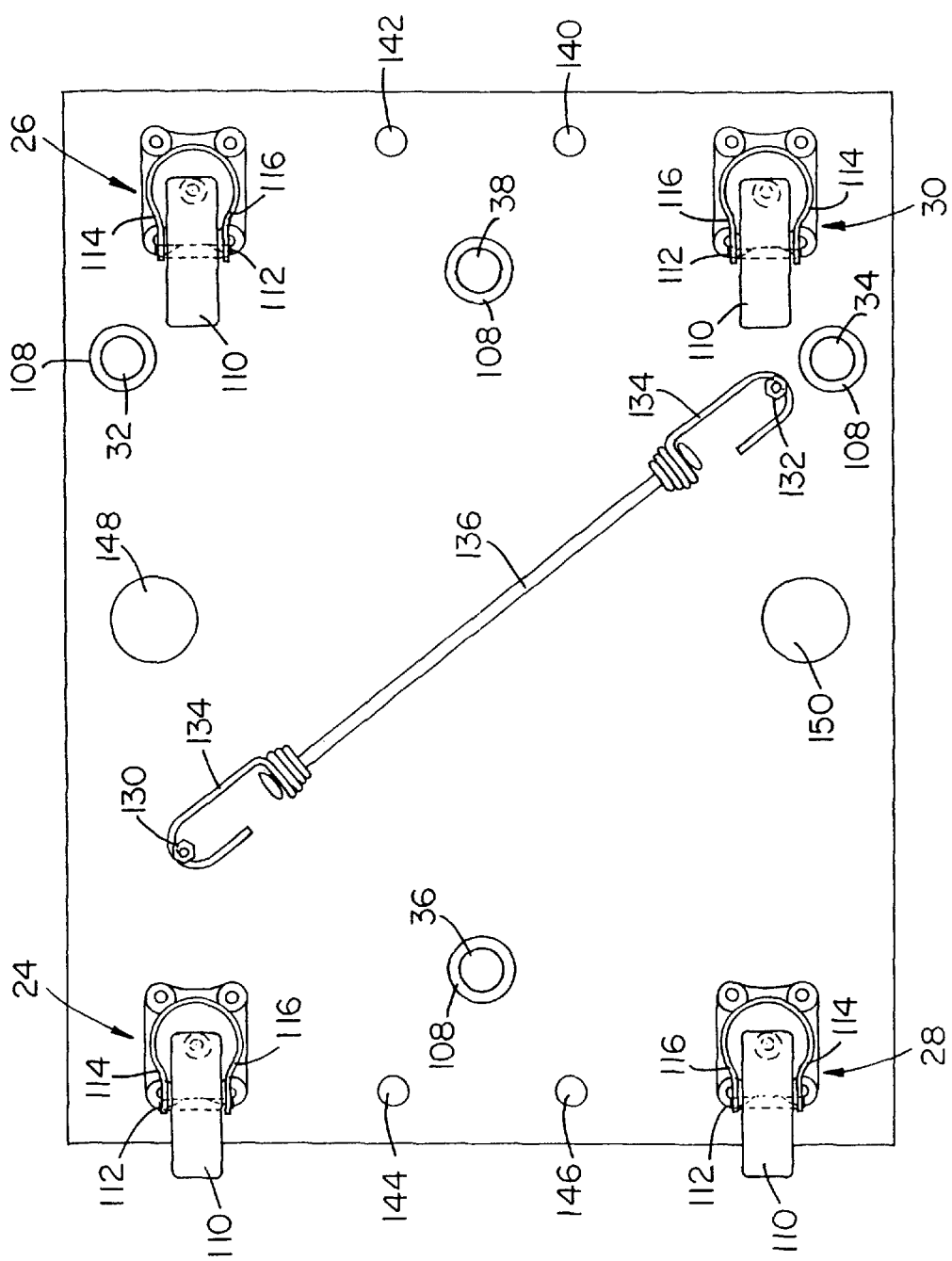
FIG. 8 is a bottom view of the base illustrated in FIGS. 1–7, without the handle being inserted into the base.

Reference is now made to FIGS. 1–16 of the drawing wherein household cart 20 is illustrated as including laminated pressed plywood rectangular base 22, carrying four caster assemblies 24, 26, 28 and 30, in proximity to each of the four corners of the base. Base 22 includes four receptacles 32, 34, 36 and 38 in the form of cylindrical bores or holes for selectively receiving legs 40 and 42 of inverted U-shaped extendable handle 44. Receptacles 32 and 34 are located approximately halfway between the back edge of base 22 and transverse center line 64 of the base. Receptacles 32 and 34 are positioned close to longitudinally extending side edges of base 22, somewhat outside the positions where caster assemblies 24–30 are located relative to the base side edges. Receptacles 36 and 38 are on longitudinal center line 66, equispaced from the front and back edges of base 22, and are spaced from each other by the same distance that receptacles 32 and 34 are spaced from each other.

Handle 44 includes hooks 51–55 bonded, e.g. by welding, to sheet metal hangar bar 56, fixedly secured by blind rivets 57 to the front of legs 40 and 42. Hooks 51–54 are adapted to carry household items, particularly household items in plastic bags of the type frequently used in packing grocery items at supermarkets. The upper portion of handle 44 includes backwardly extending bent arms 58 and 60, respectively connected to legs 40 and 42. Hooks 51–55 are equispaced from each other, with hook 53 aligned with longitudinal center line 66 of base 22. Since three hooks 51, 53 and 55 are located toward transverse center line 64 and only two hooks 52 and 54 are located toward the back edge of base 22, any tendency for cart 20 to tip as a result of the torque exerted by handle 44 on base 22 is virtually eliminated. With handle 44 in its primary position so bar 56 is transverse to the length of base 22 while legs 40 and 42 are in receptacles 32 and 34 (FIGS. 1–3), the handle is positioned so hooks 51, 53 and 55 extend toward the center of base 22, while hooks 52 and 54 extend toward the rear edge of the base, where caster assemblies 26 and 30 are located.

Hangar bar 56, which carries hooks 51–55 and extends parallel to the floor of base 22, extends between and is connected to legs 40 and 42 slightly below the intersections of legs 40 and 42 with arms 58 and 60. Bar 56 assists in stabilizing the position of legs 40 and 42 relative to each other. Tubular horizontal leg 62, extending parallel to bar 56, connects arms 58 and 60 to each other.

Arms 58 and 60 are bent toward the rear edge of base 22, enabling handle 44 to be easily grasped while a householder pushes cart 20 by grasping the handle in its primary position illustrated in FIGS. 1–3. Tubular leg 62 is aligned with a transverse line extending across base 22, between the back edge of the base and the place on the base where rear caster assemblies 26 and 30 are mounted on the base. Such a location enables the householder to easily push cart 20 along flat surfaces and pull the cart up staircases and street curbs.

When handle 44 is in its secondary position (FIGS. 4–6) so legs 40 and 42 are respectively in receptacles 36 and 38, bar 58 extends longitudinally of the base, parallel to the side walls of the base, between longitudinal center line 66 and one side edge of the base. In this position, tubular leg 62 is approximately twice as far from longitudinal center line 66 as it is from one of the longitudinally extending side edges of base 22. With handle 44 in the secondary position and the handle in the extended position, so tubular leg 62 is approximately 521" above the floor of base 22, clothes on clothes hangers (not shown) are easily and stably mounted on the tubular leg. The 52" height of tubular leg 62 above the floor of base 22 enables elongated clothing items, such as men's topcoats, pants, skirts and full length dresses to be suspended by hangars placed on the tubular leg without the clothing items contacting base 22. Simultaneously, grocery bags and bags containing other household items can be mounted on hooks 51–55.

The configuration is quite stable and tipping is virtually precluded by hanging bags containing household items on hooks 51, 53 and 55 while clothes are hung from tubular leg 62. The hanging bags on hooks 51, 53 and 55 tend to equalize the counterbalancing torque exerted on legs 40 and 42 by the clothes hung from tubular leg 62. The location of caster assemblies 24–30 on base 22 and the position of caster assemblies 24–30 relative to receptacles 34–40 are such that the torque of the household items and/or garments on hooks 51–55 and 70–72 of handle 44 does not cause base 22 to tilt.

In an alternate configuration, illustrated in FIGS. 11 and 12, handle 44 does not include rearwardly extending arms 58 and 60 nor does it include hangar bar 56. Instead, in the configuration illustrated in FIGS. 11 and 12, handle 44 merely includes legs 40 and 42 and tubular transversely extending leg 62. In the configuration of FIGS. 11 and 12, hooks 51–55 extend from transverse leg 62, instead of from a hangar bar. In addition, hooks 70 and 72 are mounted on vertically extending legs 40 and 42 at approximately the same place where hangar bar 56 is attached to legs 40 and 42 in the embodiment of FIGS. 1–6. Hooks 70 and 72 extend in the same direction as hooks 51, 53 and 55, i.e., toward transverse center line 64 of base 22. The alternate arrangement of FIGS. 11 and 12 is somewhat less expensive than the handle configuration of FIGS. 1–6, but is not as maneuverable.

As previously indicated, legs 40 and 42 of handle 44 selectively lengthen and shorten, so in a first shortened position, tubular leg 62 is approximately 34" above the upper face of base 22 and in the second, extend position, the tubular leg is approximately 54"; above the base upper face. To this end, each of legs 40 and 42 selectively includes two tubes 74 and 76, FIG. 10. In the extended position, both of tubes 74 and 76 are connected together, but in the shortened position, only upper tube 74 is used.

Lower, extender tube 76 includes flared wall 78, extending between lower smaller diameter cylindrical section 80 and upper larger diameter cylindrical section 82. Upper cylindrical section 82 has an inner diameter slightly greater than the outer diameter of lower cylindrical section 80 and the outer diameter of upper tube 74, thereby enabling the lower end of tube 74 to fit into upper section 82 of tube 76, above flared wall 78. The bottoms of upper and lower tubes 74 and 76 are identical, enabling (1) either of tubes 74 and 76 to fit into receptacles 32, 34, 36 and 38 of base 22, and (2) upper tube 74 to fit into cylindrical upper section 82 of tube 76.

To these ends, inverted U–shaped spring blades 84 and 86 are respectively inserted into the bottom portions of tubes 74 and 76. Each of springs 84 and 86 includes a side leg 88 that frictionally engages and runs along the lower portion of the interior walls of tubes 74 and 76. Each of springs 84 and 86 includes a further leg 90, having a lower edge frictionally engaging the interior walls of tubes 74 and 76 at locations diametrically opposite from the portions of the tubes engaged by legs 88. Legs 88 are held in place and selectively released from tubes 74 and 76 by extender release buttons 92 and chamfered retention button 94, both spring biased by one of springs 84 or 86; buttons 92 and 94 are fixedly mounted on leg 88 of each of springs 84 and 86. Buttons 92 and 94 on the spring 84 located in tube 74 respectively extend through circular openings 96 and 98 in the side wall of tube 74 engaged by leg 88. Openings 96 and 98 are spaced from each other by the same distance buttons 92 and 94 are spaced from each other. Upper cylindrical portion 82 of tube 76 includes elongated slot 100 through which chamfered button 94 extends. The diameters of release and retention buttons 92 and 94 are slightly smaller than the diameters of circular openings 96 and 98 and the widths of slots 100 in the tubes of handle legs 40 and 42. The chamfered, i.e., inclined, portion of button 94 extends through the lower portion of slot 100, with the upper segment of button 94 extending through both opening 98 and slot 100. Buttons 92 and 94 on spring 86 in tube 76 interact with tube 76 in much the same way that buttons 92 and 94 interact with tube 74 and cylindrical upper portion 82 of tube 76, except that chamfered button 94 extends only through a slot in tube 76 and does not extend through an opening in the second tube.

Each of tubes 74 and 76 carries, between buttons 92 and 94, a flange 102, including a neck 104 bonded to the exterior wall of its respective tube 74 or 76. Each of flanges 102 also includes a radially extending ear 106, having a flat bottom face. The flat bottom face of ear 106 on tube 76 engages the flat upper face of base 22 while handle 44 is in its extended position. Simultaneously, button 94 engages the exposed, lower face of washer 108 that is fixed to the bottom face of base 22. One of washers 108 surrounds each of the cylindrical bores forming receptacles 32, 34, 36 and 38. Flanges 102 and washers 108 function similarly to bushings, to absorb a substantial amount of the torque exerted by legs 40 and 42 of handle 44 on the walls of receptacles 24–30, to reduce significantly the tendency of the cylindrical bores comprising receptacles 32, 34, 36 and 38 to expand with use. In addition, flanges 102 limit how far handle legs 40 and 42 can be inserted into receptacles 32–38 by functioning as limit stops for the legs.

Because release buttons 92 are spaced from flanges 102, a householder is able easily to operate the release buttons. Because of the chamfer on retention buttons 94, the retention buttons slip into slots 100 in the tubes of handle legs 40 and 42 without action by the householder. When tubes 74 are inserted deep enough into extension tube 76 or into base 22 or is stopped by flange 102, retention buttons 94 are released from the inner walls of tube 74 or 76, whereby spring blades 86 move the retention buttons outwardly.

Release buttons 92 hold handle 44 in place and prevent accidental removal of handle 44 from base 22 or tube 74 from tube 76. Retention buttons 94 allow a householder to lift the cart by pulling tubular leg 62 upwardly so the cart can be pulled up steps and street curbs. To disassemble handle 44, the householder presses release buttons 94 and pulls tubes 74 or 76 out of receptacles 32–40 in base 22 or extension tubes 76. Release buttons 92 are longer than retention buttons 94 so motion of each release button is transferred to its associated retention button through the spring blade 88 to which the buttons are bonded. To assist in the motion transfer, spring blade 88 includes arcuate metal backing 107 that extends between and slightly beyond buttons 92 and 94, to provide a reinforced, i.e., stiffened, region between the buttons. By pressing release button 92, retention button 94 is pulled completely beyond the interior wall of tube 74 or 76 to the inside of the tube, to enable the tube to be pulled out of one of receptacles 24–30 or the extender tube 76.

As illustrated in FIGS. 3, 6, 7 and 8, each of caster wheel assemblies 24, 26, 28 and 30 is of a conventional type, including wheel 110 (preferably having a 2½" diameter), mounted on axle 112, in turn mounted on sheet metal skirts 114 and 116 which protrude downwardly from the bottom face of base 22. The upper ends of skirts 114 and 116 are attached to bridge 118 carrying a bearing assembly (not shown). Bridge 118 is fixedly mounted on and suspended from plate 124, including a circular opening 126 at each of its four corners. Caster assemblies 24–30 are secured to base 22 by inserting carriage bolts 128 through openings 126 and bores in base 22. Each of the carriage bolts is fixed to base 22 with the aid of a spring washer and hexagonal nut. Alternatively, the swivel caster assemblies 24–30 are mounted on the base with four round or flat head screws inserted into the bottom side of base 22. Caster assemblies 24–30 are mounted so wheels 110 can swivel through 360° and so the caster assemblies do not interfere with anything mounted on the bottom of base 22, to allow for easy movement of cart 20 in any direction.

Figure 9:
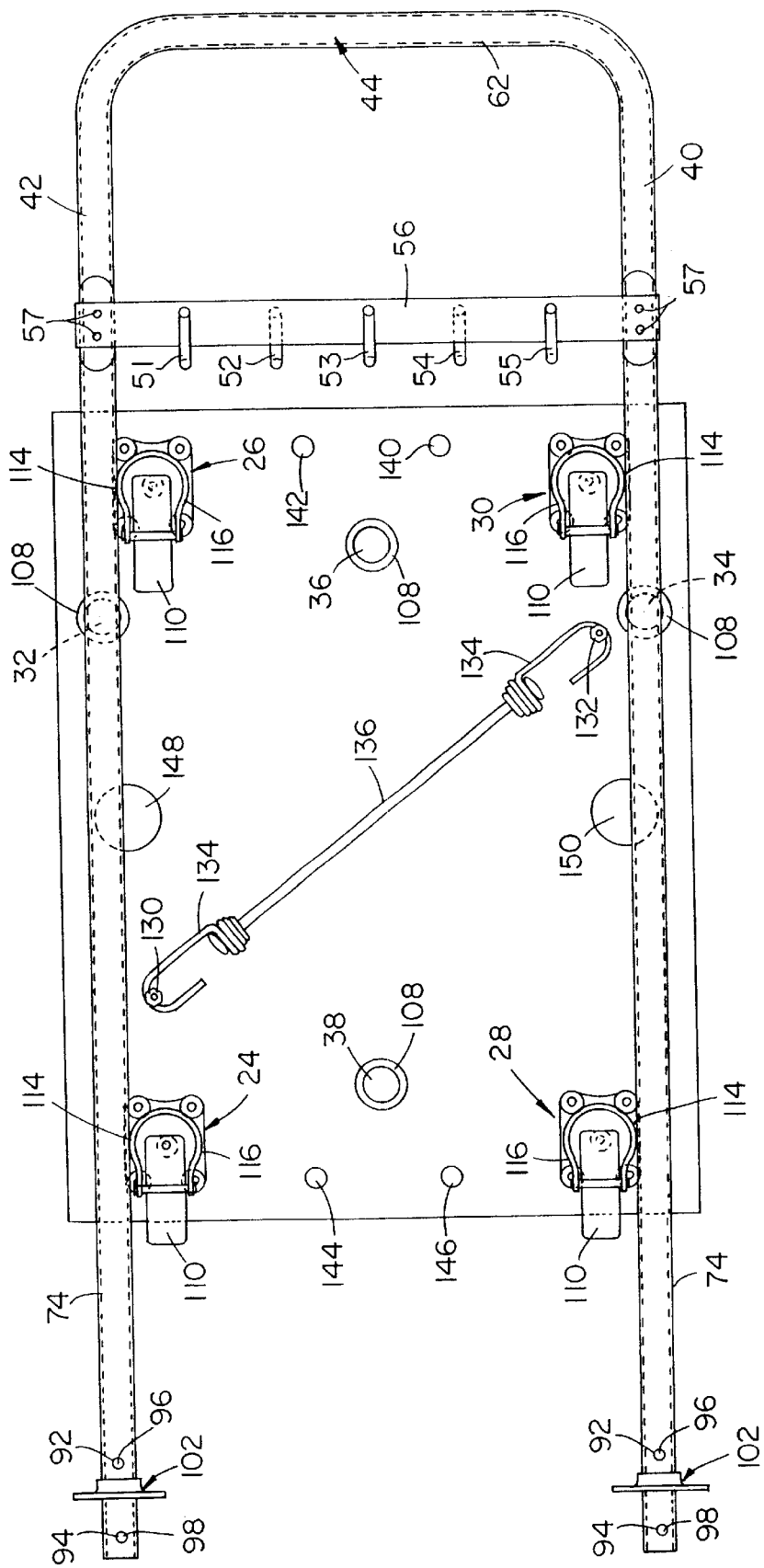
FIG. 9 is a bottom view of the base, with the handle stowed in place on skirts carried by wheel assemblies of the base.
Figure 10:
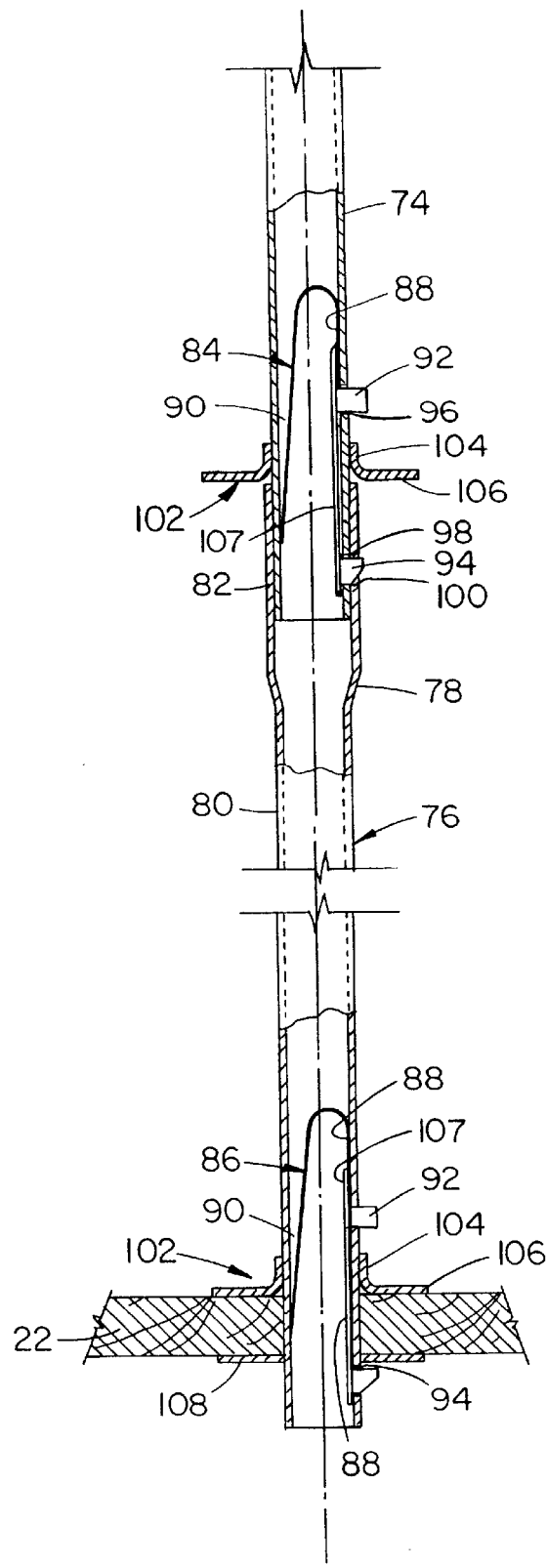
FIG. 10 is a partial side sectional view of one leg of the handle and a preferred assembly for enabling the handle to expand selectively.

Caster assemblies 24, 26, 28 and 30 are positioned on the bottom face of base 22 and handle 44 is dimensioned, has a shape and has spring properties such that the handle can be stowed on the base by snapping the handle to the caster assemblies, as illustrated in FIG. 9. The separation between exterior, spring like skirts 114 of front casters 24 and 28 and the separation between exterior skirts 114 of rear caster assemblies 26 and 30 are slightly greater than the spacing between the wall surfaces of legs 40 and 42 facing toward longitudinal center line 66. Handle 44, being made of thin walled aluminum tubing, has spring properties enabling tubes 74 of legs 40 and 42 to be pulled slightly apart so the retracted handle 44 can be placed over skirts 114 while caster wheels 110 extend toward the front edge of base 22, parallel to longitudinal axis 66 of base 22. The spring properties of handle 44 and skirts 114 provide a secure friction fit between the handle legs and the caster assemblies 24–30 so the handle is maintained in situ adjacent the bottom face of base 22.

In the preferred embodiment, wherein base 22 has a length of 18" and a width of 14" and the spacing between the interior portions of legs 40 and 42 of handle 44 is 10", skirts 114 of caster assemblies 24 and 28 are spaced from each other by 10⅛" as are skirts 114 of caster assemblies 26 and 30, when the caster wheels 110 are in the position described above, and illustrated in FIG. 9. During storage and transport of cart 20, extension tubes 76 of handle 44 are secured to the bottom face of base 22 by elasticized cord 136. The stated dimensions of retracted handle 44 and base 22 enable the entire cart to fit in small volumes in a residence (including an efficiency apartment) and into the trunk of virtually all automobiles. Sufficient space is left in automobile trunks for household items that have been purchased from the grocery store or the like.

Base 22, being ⅝" thick in the preferred embodiment, can carry relatively heavy items, such as cases of beverages and watermelons, which are not suitably loaded onto hooks 51–55 or 70 and 72 of handle 44. To assist in loading such household items on base 22, the base carries one or more elasticized cords on a pair of studs 130 and 132 downwardly depending from the bottom face of base 22. Studs 130 and 132 are formed as hex head screws threaded into the bottom face of base 22, adjacent diagonally opposite caster assemblies 24 and 30, respectively. Studs 130 and 132, positioned between caster assemblies 124 and 130 and transverse center line 64, are spaced from each other to receive hooks 134 fixedly mounted on opposite ends of elasticized cord 136, preferably the conventional bungee type. Studs 130 and 132 are long enough (preferably so the heads thereof are about 1" from the bottom face of base 22) to receive at least one and, if possible, two elasticized cords 136, each having a length, from hook to hook, of approximately 18".

Base 22 includes circular openings 140, 142, 144, 146, 148 and 150 for receiving hooks 134 of cords 136 when the cords are used as tie downs for relatively heavy household articles placed on the upper face of base 22. Each of openings 141, 142, 144 and 146 has a relatively small diameter and is located equidistant from longitudinal center line 66, with openings 144 and 146 being spaced from the front edge of base 22 by the same amount that openings 140 and 142 are spaced from the back edge of the opening. In one preferred embodiment, each of openings 140–146 has a diameter of approximately ½" and its center is about 1½" from the adjacent front or back edge and approximately 1½" from longitudinal center line 66. Each of larger openings 148 and 150 is equispaced from an adjacent side edge of base 22 and has its center point located substantially on transverse center line 64. In a preferred embodiment, each of openings 148 and 150 has a diameter of approximately 1½" and its center point is approximately 2½" from its adjacent side edge.

The stated location of openings 140–150 enables hooks 134 of cords 136 to be placed in the holes without interference of handle 44 in both upright positions of the handle. To this end, the preferable locations of the center and circular bores (preferably about ¾" diameter) constituting receptacles 32, 34, 36 and 38 are for receptacles 32 and 34, 1" from each side wall and 4½" from the back edge of base 22 and for receptacles 36 and 38, 3" from the front and back edges of base 22 on axis 66. Of course, when elasticized cords 136 are used as tie down devices with hooks 134 in holes 140–150, the elasticized'cord is stretched over the relatively heavy object and exerts a force against the object, to hold it in place on the top face of base 22.

The household cart of the invention can also be used as a dolly for heavier household articles, such as refrigerators. For such a use, handle 44 is completely removed from base 22 and the householder places the heavier article on the base. Tie down ropes for the heavier article preferably extend through openings 140–146 and around and/or over the heavier article on base 22. A householder pushes the article loaded on the cart, to move the cart and the article it carries.

One use of the cart is to transport relatively long garments, such as topcoats, full length dresses, skirts and pants. For this function, handle 44 is in the extended position, so hooks 51–55 are approximately 52" above the top face of base 22. With such a spacing between hooks 51–55 and the top face of base 22, the elongated clothing items, when carried by a hangar suspended from the hooks, do not contact the base. The clothing articles are not compressed against each other while the cart carries them because the hung articles are individually suspended from hooks 51–55 or from bar 56 or tubular leg 62.

Figure 13:
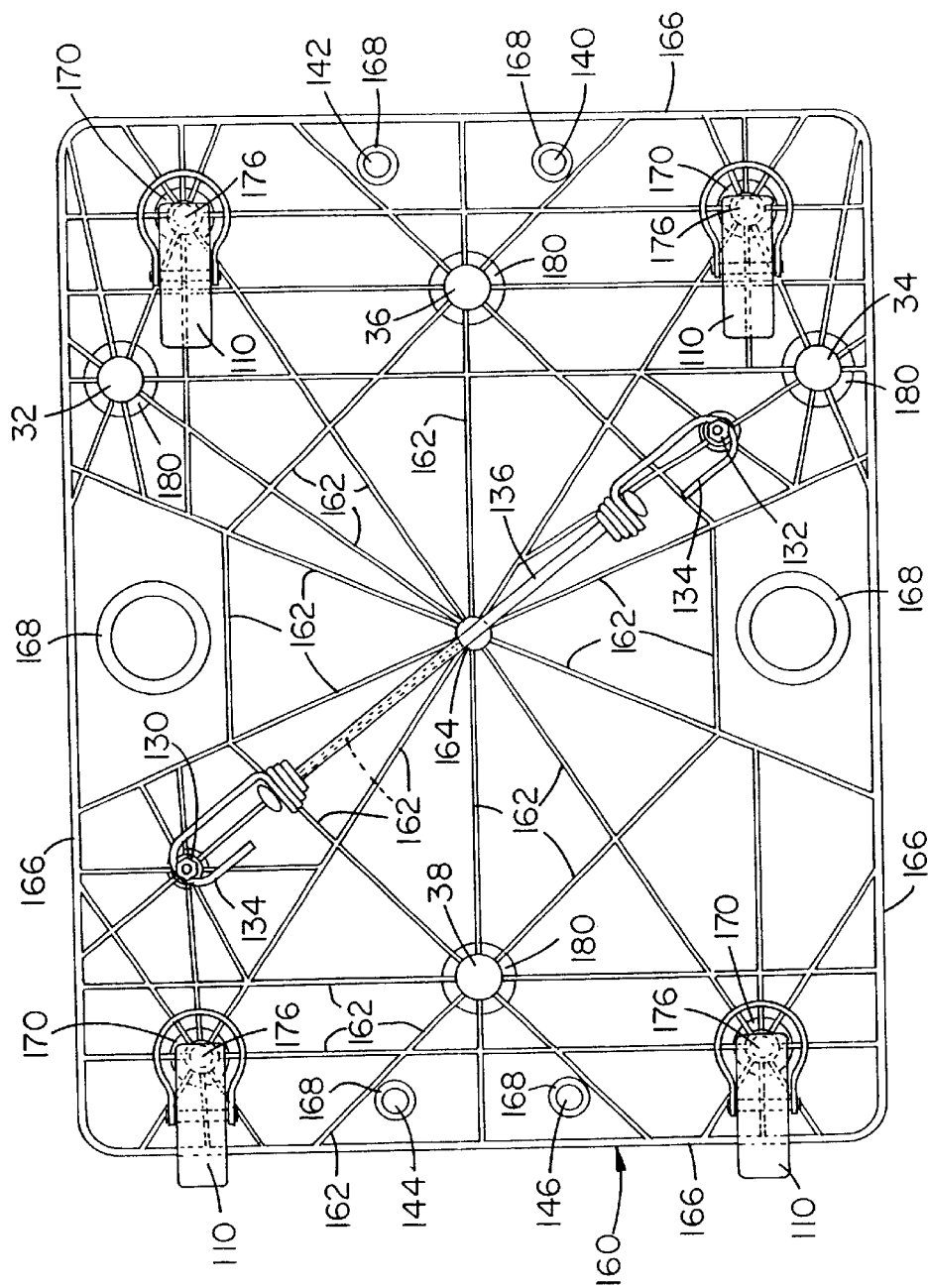
FIG. 13 is a bottom view of a modified version of the base of the cart, wherein the base is fabricated of molded plastic.
Figure 14:
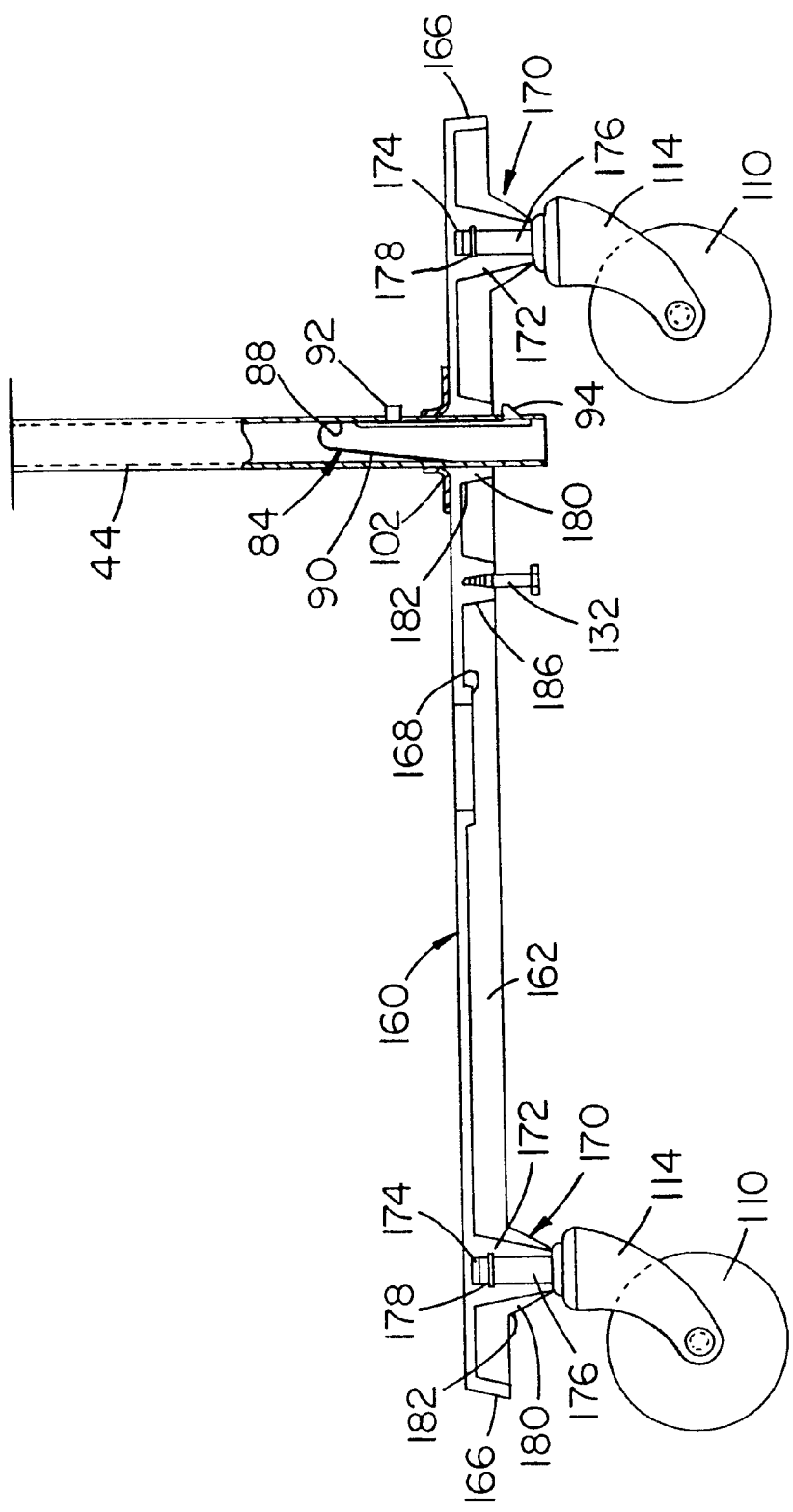
FIG. 14 is a side sectional view of the base illustrated in FIG. 13.

Reference is now made to FIGS. 13 and 14 of the drawing, an illustration of a second embodiment of the invention wherein laminated plywood base 22 is replaced by molded plastic base 160 having approximately the same size and shape as the wooden base. However, plastic base 160 has rounded corners instead of corners defined by a pair of side edges that intersect each other at 90°. In one preferred embodiment, base 160 is ⅝" thick and includes reinforcing ribs 162 having a height of approximately 1" and a thickness of approximately ⅛". Molded plastic base 160 is preferably a high or low density thermoplastic material which can be recycled, e.g., low grade polyethylene. Reinforcing ribs 162 are interlaced to reinforce the needed standoff and to leave free regions where hooks and cords are located. Ribs 162 extend longitudinally transversely and diagonally with eight ribs extending radially from each of the significant load bearing openings in base 160 corresponding to receptacles 32, 34, 36 and 38, as well as the mounting locations for caster assemblies 24, 26, 28 and 30 and the regions on base 160 corresponding to the locations of studs 130 and 132. Molded base 160 includes downwardly depending center stud 164 from which eleven ribs 162 extend radially. Base 160 includes sloping front, back and side walls 166 which effectively function as skirts, having the same height as ribs 162 and stud 164. Each of openings 140–150 has a reinforced annular edge 168, resulting from increasing the thickness of base 160 from ⅝" to 1".

Base 160 includes four wells 170, one for receiving each of caster assemblies 24, 26, 28 and 30. Each of wells 170 includes a protruding and slanted standoff 172, including bore 174 for receiving stem 176 of a different one of the caster assemblies. Stem 176 includes a horizontal groove carrying O-ring 178. Bore 174 includes a groove for receiving O-ring 178, so the O-ring functions as a retention ring for the caster assembly, to hold the caster assembly in place on base 160. Standoff 172 extends below skirt 166 to provide an adequate reinforced base to hold stem 176 in place; in a preferred embodiment, standoff 172 is long enough to accommodate a 1.25" long stem. Base 160 has an enlarged thickness, equal to the height of skirt 166, at the location of each of the cylindrical bores defining receptacles 24, 26, 28 and 30. The enlargement is defined by a frustoconical segment 180, having a tapered side wall 182, extending downwardly and inwardly from a base on the bottom face of base 160. Side wall 182 slopes 87.5° from its intersection with the lower face of base 160, as do skirt 166 and standoff 172.

Base 160 also includes a pair of frustoconical downwardly extending extensions 186, each having the same height as skirts 166 and the same side wall sloping dimensions as side wall 182 of frustoconical extension 180. Extensions 186 include a threaded bore for receiving hex head screws 130 and 132 on which one or two elasticized cords 136 are mounted by hooks 134.

While there have been described and illustrated several specific embodiments of the invention, it will be clear that variations in the details of the embodiments specifically illustrated and described may be made without departing from the true spirit and scope of the invention as defined in the appended claims.

We claim:

1. A method of using a household cart having: a base for carrying household items and having front, back and side edges and carrying two wheels adjacent the back edge and at least one wheel adjacent the front edge; a handle for carrying household items, the handle having a retracted position and an extended position, the handle being lockable in the extended position; the base including first, second, third and fourth receptacles, the first and second receptacles being adjacent the back edge for selectively receiving first and second opposed legs of the handle and positioned to cause the handle to extend substantially transversely of the base, between the side edges, the third and fourth receptacles being positioned approximately midway between the side edges for selectively receiving the first and second opposed legs of the handle and positioned to cause the handle to extend substantially longitudinally of the base between the front and back edges; the legs having a fixed separation; the base including an arrangement for securely carrying the handle in the retracted position; the method comprising: removing the handle from the base while the handle is in the retracted position; after the handle has been removed from the base exerting a force on the handle to move the handle from the retracted position to the extended position and to lock the handle in the extended position; positioning the handle in the first and second receptacles during a first time interval; positioning the handle in the third and fourth receptacles during a second time interval which differs from the first time interval; causing the cart to be loaded with household items during both of the intervals; and moving the cart during both of the intervals by exerting forces on the handle while the handle is locked in the extended position and while the cart is loaded.

2. The method of claim 1 wherein the handle includes holders for some of the household items and the causing the cart to be loaded step includes mounting household items on the holders while the handle is locked in the extended position, the moving step being performed while the household items are mounted on the holders.

3. The method of claim 1 wherein the handle includes holders on opposite sides of the handles for some of the household items, the holders being positioned so that a first holder extends toward the front edge and a second holder extends toward the back edge while the handle is in the first and second receptacles, and the causing to be loaded step includes mounting household items on the first and second holders while the handle is locked in the extended position, the moving step being performed while the household items are mounted on the first and second holders.

4. A housedhold cart comprising: a base for carrying household items and having front, back and side edges and carrying two wheels adjacent the back edge and at least one wheel adjacent the front edge; a handle for carrying household items, the handle having a retracted position and an extended position, the handle being lockable in the extended position; the base including first, second, third and fourth receptacles, the first and second receptacles being adjacent the back edge for selectively receiving first and second opposed legs of the handle and positioned to cause the handle to extend substantially transversely of the base, between the side edges, the third and fourth receptacles being positioned approximately midway between the side edges for selectively receiving the first and second opposed legs of the handle and positioned to cause the handle to extend substantially longitudinally of the base between the front and back edges; the legs having a fixed separation; the base including an arrangement for securely carrying the handle in the retracted position; the handle being positionable in the first and second receptacles during a first time interval and positionable in the third and fourth receptacles during a second time interval, and the handle being positionable in a storage position against a surface of the base.

5. The cart of claim 4 wherein the handle includes holders for some of the household items.

6. The cart of claim 4 wherein the handle includes holders on opposite sides of the handles for some of the household items, the holders being positioned so that a first holder extends toward the front edge and a second holder extends toward the back edge while the handle is in the first and second receptacles.

* * * * *